Oct. 4, 1938.                P. J. GRAHAM                2,132,106
                          OPHTHALMIC MOUNTING
                          Filed June 20, 1936

INVENTOR
Philip J. Graham.
BY
ATTORNEY

Patented Oct. 4, 1938

2,132,106

UNITED STATES PATENT OFFICE 2,132,106

OPHTHALMIC MOUNTING

Philip J. Graham, Leominster, Mass., assignor to Fosgood Corporation, Leominster, Mass., a corporation of Massachusetts Application June 20, 1936, Serial No. 86,303

3 Claims. (Cl. 88—47)

This invention relates to ophthalmic mountings and particularly to lens mountings for eyeglasses, spectacles, goggles, sun glasses and the like.

Heretofore, in making such mountings, the frames were first formed to shape and then the inner face of each lens mount was grooved to receive the lens, the frame being sprung around the lenses to hold them in place in the grooves.

This manner of manufacture necessitated that the grooving of the lens mounts be performed as a separate operation, thus increasing the cost of manufacture and resulting in waste of material. Furthermore, where the lenses are thus held in grooves, even slight variations in the diameter or thickness of the lens frequently results in breakage of the glass.

An object of the present invention is to overcome these objections by the provision of a lens mounting having a shoulder formed therein, upon which shoulder the lens is laid, the material of the mounting being rolled or curled over on the lens to hold it in place.

Other objects of the invention are to provide a process of making an eyeglass frame of the character described that will greatly reduce the cost of manufacture, and that will eliminate the necessity of grooving the frame.

Further objects and advantages of the invention will appear from the following description thereof, reference being had to the accompanying drawing, in which:—

Fig. 3 is a similar view showing a lens resting on the shoulder of the mount;

Fig. 4 is a sectional view showing the projecting portion of the wall of the mount bent or curled down over the edge of the lens to hold it in place;

Fig. 6 is a sectional view of a modified mount showing a lens seated therein; and Fig. 7 is a similar view showing the projecting portion of the wall of the mount bent or curled down over the edge of the lens.

The mounting or frame 10 is molded, cast, or formed of a cellulose composition, metal, or other suitable plastic or bendable material. The two lens mounts of the frame are each formed with an interior shoulder 11 having an inwardly extending portion or wall 12 and an upwardly extending portion or wall 13.

Figure 1:
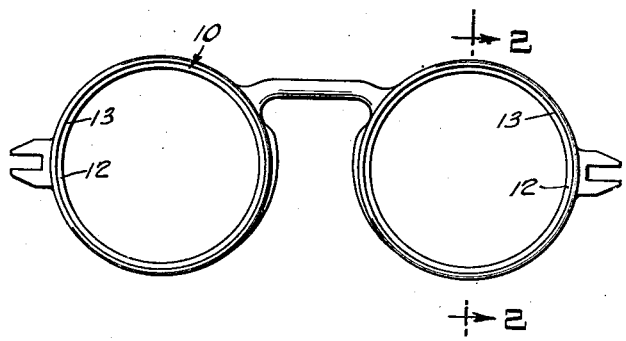
Figure 1 is a plan view of the mounting before the lenses have been affixed.
Figure 2:
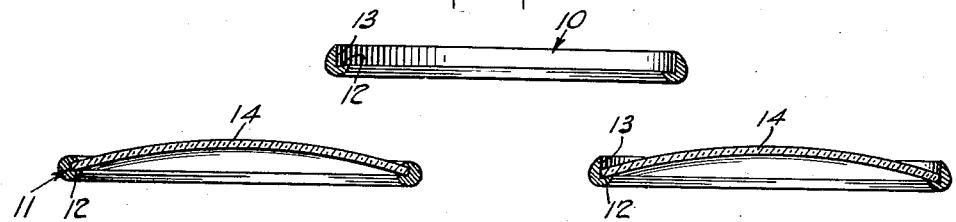
Fig. 2 is a sectional view on an enlarged scale, taken on the line 2—2 of Figure 1, of one of the lens mounts.

The lens 14 is laid in the opening of the mount with its edge seated or resting on the shoulder portion or wall 12. In the form of mount shown in Figs. 2–4, the concave face of the lens rests on this wall and accordingly the shoulder is preferably so formed that the annular wall 12 forms an angle of slightly less than 90° with the upright wall 13. The shoulder portion or wall 13 is longer or higher than the thickness of the lens 14 so that when the lens is placed in the mounting a part of the wall extends upwardly or outwardly beyond the lens, as seen in Fig. 3.

After the lens is placed in the mount, the upwardly projecting portion of the wall 13 is bent or curled down on the edge of the lens, as seen in Fig. 4, to fasten and hold the lens in place. This bending or curling operation may be performed with any suitable die or curling tool, the lens mount itself being held in a holding die or support while the material is being curled. The bending or curling is preferably performed without the use of heat.

Figure 5:
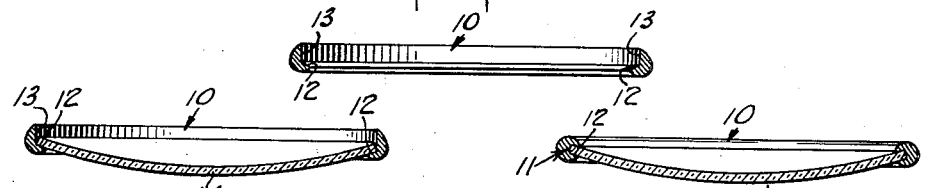
Fig. 5 is a sectional view of a modification of the lens mount.

A modification of the mounting is shown in Figs. 5–7. In this form of mounting, the lens is laid with its convex face resting on the shoulder portion or wall 12 and, accordingly, in this form, the shoulder is preferably formed so that the annular wall 12 forms an angle of slightly more than 90° with the upright wall 13. After the lens has been placed in the mounting, the projecting portion of the wall 13 is bent or curled over as previously described.

It will be understood that various modifications may be made in the details of construction, and the sizes and shapes of parts, herein illustrated and described, without departing from the spirit and scope of the invention.

What I claim is:—

1. A lens mounting frame comprising a body of plastic material formed to provide an inwardly extending lens supporting shoulder, and an internal wall disposed at substantially right angles to the shoulder, said wall being free of internal strain and of sufficient height to afford a securing means when the same is bent inward over a portion of a lens supported on said shoulder.

2. A lens mounting frame blank comprising a body of thermo-plastic material formed to provide an inwardly extending lens supporting shoulder, and an internal wall disposed at substantially right angles to the shoulder and extending axially of the lens opening, the area of the opening defined by said wall being of a size to permit substantially free insertion of a lens within the frame toward said shoulder, and said wall being free of internal strain and of sufficient length axially of said opening to afford a securing means when the same is forcibly bent inward over a portion of a lens supported by the shoulder.

3. A lens mounting frame blank comprising a body of plastic material formed to provide an internal annular lens supporting shoulder, and an annular wall free of internal strain surrounding and disposed substantially at right angles to the shoulder and of a height to afford a securing means when bent inwardly over a portion of a lens supported by said shoulder.

PHILIP J. GRAHAM.